UNITED STATES PATENT OFFICE.

AUGUSTE A. X. OKOLOWICZ, OF MOLENBECK-LEZ-BRUXELLES, BELGIUM.

IMPROVEMENT IN APPLYING COLORS TO EARTHENWARE, &c.

Specification forming part of Letters Patent No. 208,418, dated September 24, 1878; application filed June 8, 1878.

*To all whom it may concern:*

Be it known that I, AUGUSTE ADOLPHE XAVIER OKOLOWICZ, of Molenbeck-lez-Bruxelles, in the Kingdom of Belgium, have invented certain new and useful Improvements in the Process of Applying Vegetable and Mineral Colors to Earthenware and Porcelains, which process is fully described hereinafter.

It consists, principally, in slightly baking the clay, then mordanting, then coloring, and finally rebaking the same.

In carrying out my invention the clay employed in the manufacture of earthenware and porcelains should, after having been fashioned into the object desired, first be slightly baked. The articles so prepared are then mordanted, which may be effected in various ways and by means of various acids, though I prefer as mordant a colorless acid, such as acetate of alumina, or chloride of tin, or cream of tartar, though any other suitable acid may be employed. The mordanting may be effected by means of alcohol of from 40° to 90° Gay-Lussac, or by heating the mordant without alcohol to a temperature of from 100° to 150° centigrade. When this latter method of mordanting is employed the heating may be effected upon an open fire or by means of steam admitted to a coil arranged within the vessel.

When the articles have been mordanted they are then colored. This coloring may be effected in various ways. For instance, the articles may be steeped in alcohol, in which the pigment or pigments are held in solution; or, instead of alcohol, ether or other volatile essences may be employed; or the coloring may be effected in a water-bath holding the coloring matter in solution, a small quantity of alcohol being added to the bath, which is heated to about 150° centigrade; and, finally, the articles so baked, mordanted, and colored are again baked to the required hardness of the ware to which the article pertains when it is glazed or enameled, as the case may be.

Having now described my invention, what I claim, and desire to secure by Letters Patent, is—

The process of applying vegetable and mineral colors to earthenware and porcelain by slightly baking the articles, then treating them with mordants, and then applying the colors to such articles, and finally rebaking them, substantially in the manner as hereinbefore described.

In witness that I claim the foregoing I have hereunto set my hand this 28th day of September, 1877.

A. A. X. OKOLOWICZ.

Witnesses:
   H. LABAT,
   FRANK NORTON.